Figures 1, 2, 3:
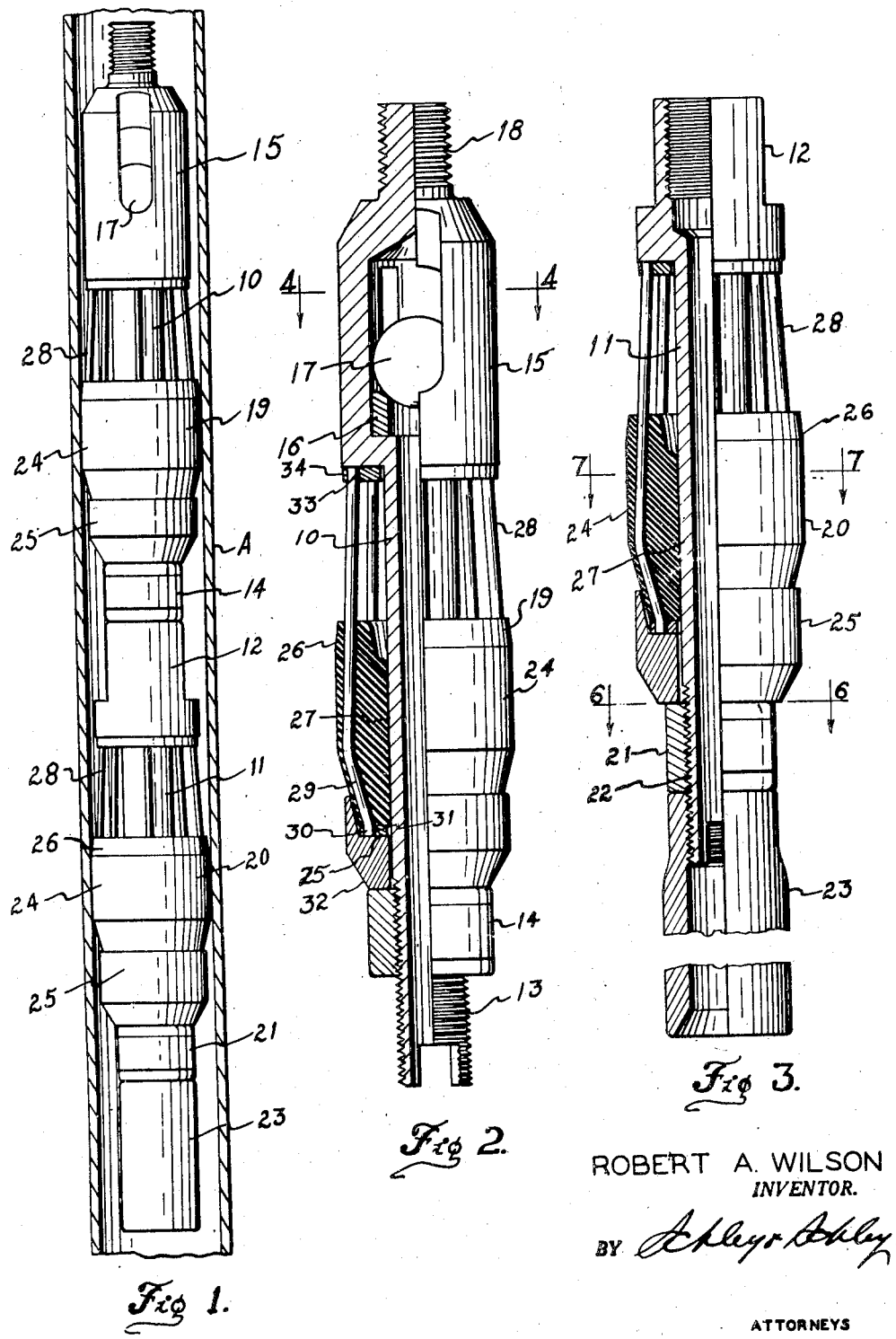

Dec. 14, 1948.           R. A. WILSON                2,456,551
                          WELL SWAB
Filed Nov. 19, 1945                              2 Sheets-Sheet 1

ROBERT A. WILSON
    INVENTOR.

BY

ATTORNEYS

Dec. 14, 1948.                R. A. WILSON                    2,456,551
                                WELL SWAB
Filed Nov. 19, 1945                                      2 Sheets-Sheet 2
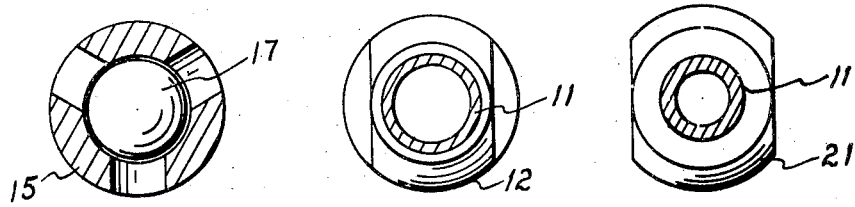
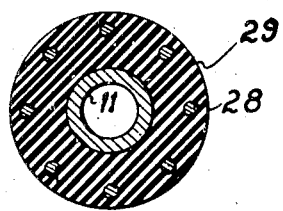
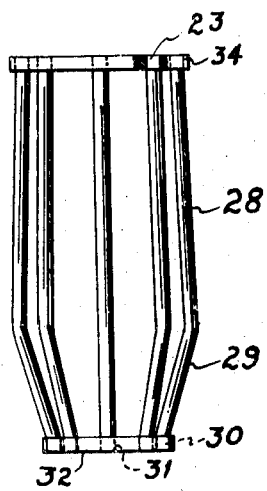
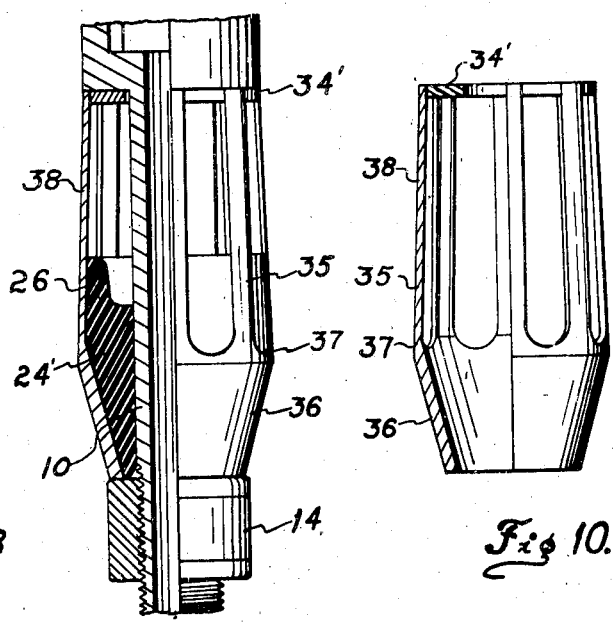
ROBERT A. WILSON
        INVENTOR.
BY *Schley & Ashley*
ATTORNEYS Patented Dec. 14, 1948

2,456,551

UNITED STATES PATENT OFFICE 2,456,551

WELL SWAB

Robert A. Wilson, Dallas, Tex.

Application November 19, 1945, Serial No. 629,637

4 Claims. (Cl. 309—4)

1

This invention relates to new and useful improvements in well swabs.

One object of the invention is to provide an improved swab assembly which lends itself to ready and secure assembling of the various elements.

A further object of the invention is to provide an improved swab and cage unit which eliminates internal collars, has the cage or wickers molded in the swab cup and employs a retaining ring at the upper end of the cage, whereby a more efficient, substantial and longer lasting unit is formed.

Another object of the invention is to provide an improved swab assembly wherein a separable tubular mandrel is employed, whereby the assembly may be readily separated between the swab and cage units for the purpose of easy assembly as well as for quick and simple disconnection to obtain access to the swab units for replacement.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is an elevation of a swab assembly constructed in accordance with the invention in position in a tubing or casing, which is shown in vertical section, Fig. 2 is an enlarged view of the upper section of the assembly, partly in elevation and partly in section, Fig. 3 is a similar view of the lower section of the assembly, Fig. 4 is a horizontal cross-sectional view taken on the line 4—4 of Fig. 2, Fig. 5 is a plan view of the lower section, Fig. 6 is a horizontal cross-sectional view taken on the line 6—6 of Fig. 3, Fig. 7 is a horizontal cross-sectional view taken on the line 7—7 of Fig. 3, Fig. 8 is an elevation of one of the swab cages, Fig. 9 is a partial elevation and vertical sectional view of a modified form of the invention, and Fig. 10 is a view of the cage shown in Fig. 9.

In the drawings, the numeral 10 designates the upper section and 11, the lower section of a tubular mandrel. The lower mandrel section has an internally screwed box 12 at its upper end and the lower end of the upper section 10 is provided with external screw threads 13 for receiving a flat

2 sided nut 14. The threaded end of the section 10 is screwed into the box 12 to join the sections.

The upper end of the section 10 is made integral with, or permanently secured to, a valve cage 15 having a standard ring seat 16 and a valve ball 17, therein. The cage may be made in two parts and welded together; the ball and seat form no part of the invention. The upper end of the cage is reduced and formed with a screw-threaded pin 18, whereby the swab assembly may be connected with a sub or other means (not shown) to run the swab up and down the tubing or casing A.

A swab and cage unit, indicated generally by the numeral 19 is confined on the upper mandrel section between the nut 14 and the valve cage 15. A swab or cage unit 20 is confined on the lower section 11 between the box 12 and a nut 21. The lower end of the lower section is formed with screw threads 22 for receiving the nut 21. A sleeve 23 is screwed onto the threads 21 against the nut 22.

As the swab and cage units are substantially duplicates, a description of one, will suffice for both units. An elastic cup 24, preferably of synthetic rubber, has its lower end tapered to fit in a complementary shaped thimble 25 loosely surrounding the mandrel section and engaged by one of the nuts 14 or 21. The upper end of the cup is formed with an annular lip 26, the outer edge of which is slightly beveled to permit free longitudinal passage in the tubing or casing A. The elevation of the lip is comparatively short in contrast to the swab cups in common use in this art. This structure provides a more substantial cup, but permits sufficient expansion under a liquid load to adequately support the same.

The cup has an axial bore 27 extending from the base of the lip to the bottom of the cup. This bore receives the mandrel section which slides freely therethrough when the cup is placed on the section. It will be noted that the cup is free from metal liners or sleeves and embedded collars and flanges above its bottom.

The cage of the unit is formed of a plurality of upright wickers 28, the lower ends 29 of which are bent so as to conform to the taper of the cup; while the extreme lower ends are again bent to form lugs 30 which engage in apertures 31 in a base ring 32. From their bent portions 29 the wickers incline inwardly and extend a substantial distance above the cup. The upper ends of the wickers are secured in apertures 33 in a flat retaining ring 34 which abuts the bottom of the valve cage 15. It will be observed that the wickers are fully embedded in the annular wall of the cup, the material of which covers the outer sides of said wickers so that said wickers do not engage the inner surface of the tubing or casing when the swab is run.

It is pointed out that due to the ring 34 abutting the cage 15 and the ring 32 engaged by the thimble 25, the end thrust or longitudinal stress is sustained by the wickers. The cup is thus carried by the thimble and the wicker cage and no collars, sleeves or flanges bonded to or in the cup are employed to hold the unit in place, except the base collar 32. Each unit may be readily removed from its mandrel section and the sections may be quickly separated by unscrewing the box 12 from the threads 13. If it is desired to remove and replace the lower unit, it is only necessary to remove the sleeve 23 and nut 21 and the sections need not be separated.

In Figs. 9 and 10, I have shown another form of structure involving the invention. Instead of the cage wickers 28 and the thimbles 25 a unitary cage 35 is employed. This cage has an annular tapered thimble 36 at its bottom which is provided with an upwardly extending annular flange 37 integral therewith. Flat wickers 38, integral at their lower ends with the flange extend upwardly and are welded at their upper ends to a flat retaining ring 34', similar to the ring 34.

An elastic cup 24' similar to the cup is molded in this cage 35, so that the wickers are embedded in its outer surface, but do not extend beyond the outer faces of such wickers. By this arrangement the thimbles 25 may be omitted and the nuts 14 and 21 are screwed directly against the thimbles 36.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A swab unit for a well swab including, a flat base collar, a plurality of upright wickers having their lower ends secured in the outer marginal portion of the base collar, said wickers being bowed outwardly at their lower medial portions, a flat retaining ring in which the upper ends of the wickers terminate substantially flush with the top of the retaining ring, and an elastic cup molded solidly around the bowed and lower portions of said wickers and having an annular lip at its upper end, the cup having an elongate elastic bore throughout its length.

2. A well swab assembly including, an upper mandrel having a cage at its upper end having a flat annular bottom overhanging the mandrel therebelow, said mandrel having its lower end screw-threaded, a swab cup and wicker cage unit mounted on the mandrel having a cup at its lower end and wickers extending above the cup, the unit having a retaining ring secured to the upper ends of the wickers and abutting the overhanging bottom of the mandrel cage and a thimble receiving the cup and the lower ends of the wickers, a nut on the lower end of the mandrel engaging the thimble, a lower mandrel having a screw-threaded box on its upper end receiving the lower end of the upper mandrel and abutting the nut thereof, a swab cup and wicker cage on the lower mandrel abutting the box, a nut on the lower mandrel abutting the cage thereof, and a sleeve on the lower end of the lower mandrel engaging the nut thereof.

3. As a sub-combination in a well swab assembly, a wicker cage including a flat base collar with upstanding wickers extending from the collar and a retaining ring at the upper ends of said wickers, and a flexible cup molded on the collar and wickers, whereby said collar forms the bottom of the unit, the cup terminating at the medial portion of the wicker cage.

4. A well swab assembly including, an elastic cup having an annular tapered lower portion and an upright cylindrical wall, and a metallic wicker cage unit bonded to the cup and including an annular circumferential element at the bottom of the cup, upwardly extending wickers connected to the circumferential element and rigidly connected at their upper ends above the cup, the wickers having right-line elements, the lower portions of said elements being substantially co-extensive with the cylindrical wall of the cup and the upper portions of said elements extending above said cup.

ROBERT A. WILSON.

REFERENCES CITED

The following references are of record in the file of this patent:

UNITED STATES PATENTS

| Number | Name | Date |
|---|---|---|
| 518,490 | Downing | Apr. 17, 1894 |
| 1,527,956 | Mowers | Feb. 24, 1925 |
| 1,669,812 | Crickmer | May 15, 1928 |
| 1,898,292 | Crickmer | Feb. 21, 1933 |
| 2,210,245 | Kimmel | Aug. 6, 1940 |
| 2,317,433 | Bell | Apr. 27, 1943 |
| 2,358,908 | Crickmer | Sept. 26, 1944 |